US010190620B2

(12) United States Patent
Jusick

(10) Patent No.: US 10,190,620 B2
(45) Date of Patent: Jan. 29, 2019

(54) REMOTE CONTROL ASSEMBLY

(71) Applicant: Kongsberg Driveline Systems I, Inc., Novi, MI (US)

(72) Inventor: Michael Jusick, Michigan Center, MI (US)

(73) Assignee: Kongsberg Driveline Systems I, Inc., Novi, MI (US)

( * ) Notice: Subject to any disclaimer, the term of this patent is extended or adjusted under 35 U.S.C. 154(b) by 0 days.

(21) Appl. No.: 15/537,406

(22) PCT Filed: Dec. 18, 2014

(86) PCT No.: PCT/US2014/071256
§ 371 (c)(1),
(2) Date: Jun. 17, 2017

(87) PCT Pub. No.: WO2016/099518
PCT Pub. Date: Jun. 23, 2016

(65) Prior Publication Data

US 2018/0023617 A1 Jan. 25, 2018

(51) Int. Cl.
*F16C 1/10* (2006.01)
*F16C 1/26* (2006.01)

(52) U.S. Cl.
CPC ................ *F16C 1/26* (2013.01); *F16C 1/108* (2013.01); *F16C 1/10* (2013.01); *Y10T 74/2045* (2015.01); *Y10T 74/20456* (2015.01)

(58) Field of Classification Search
CPC .... F16C 1/26; F16C 1/267; F16C 1/06; F16C 1/10; Y10T 74/20456; Y10T 74/2045
See application file for complete search history.

(56) References Cited

U.S. PATENT DOCUMENTS 2,221,668 A 11/1940 Bowman
3,184,706 A 5/1965 Atkins
(Continued)

FOREIGN PATENT DOCUMENTS

GB 1 309 672 A 3/1973
WO WO0113022 A1 2/2001
WO WO2007025590 A1 3/2007

OTHER PUBLICATIONS

International Search Report for International Patent Application No. PCT/US2014/081256 completed on Aug. 28, 2015; 4 pages.
(Continued)

*Primary Examiner* — Jeremy R Severson
(74) *Attorney, Agent, or Firm* — Howard & Howard Attorneys PLLC

(57) ABSTRACT

A remote control assembly includes a sheath having a longitudinal axis along a length thereof and defining an interior. A liner is disposed within the interior and coupled to the sheath. A wire has an outer surface and the wire disposed between and coupled to the sheath and the liner. The outer surface of the wire defines a plurality of notches separated into a first group of notches and a second group of notches. Each notch within each of the first and second groups defines a first distance therebetween substantially along the longitudinal axis. The first group of notches and the second group of notches define a second distance therebetween. The second distance is greater than the first distance.

25 Claims, 4 Drawing Sheets

38 22 34 36 A 42 24 34 36 42 34 28 30 36

(56) References Cited

U.S. PATENT DOCUMENTS

| | | | | |
|---|---|---|---|---|
| 3,477,474 | A * | 11/1969 | Mesler | F16C 1/26 138/133 |
| 3,554,050 | A | 1/1971 | Conrad | |
| 3,764,779 | A | 10/1973 | Kadoya et al. | |
| 4,674,543 | A | 6/1987 | Ziemek et al. | |
| 4,951,523 | A * | 8/1990 | Shiota | F16C 1/262 74/502.5 |
| 5,129,861 | A | 7/1992 | Furukawa et al. | |
| 5,199,320 | A | 4/1993 | Spease | |
| 6,170,533 | B1 | 1/2001 | He | |
| 7,708,606 | B2 | 5/2010 | Waltz | |
| 8,327,887 | B2 | 12/2012 | Lockhart et al. | |
| 8,439,405 | B2 | 5/2013 | Trujillo et al. | |
| 2014/0251063 | A1* | 9/2014 | Wen | F16C 1/267 74/502.5 |
| 2018/0017096 | A1* | 1/2018 | Jusick | F16C 1/24 |

OTHER PUBLICATIONS

Written Opinion of the International Searching Authority for International Patent Application No. PCT/US2014/081256 completed on Aug. 28, 2015; 6 pages.

* cited by examiner 32
40
20
24
22
26
40

32
24
22
34

32
28
38
34
36
42
24
22
42
36
34

38
22
34
36
A
42
24
34
36
42
34
36
28
30
36

34
42
22
34
34
30
28
22
24
38

44
48
8
54
36
34
48
46
54
52
48
50
48
52

44
52
48
9
36
34
52
46
48
50
54
48
54
48

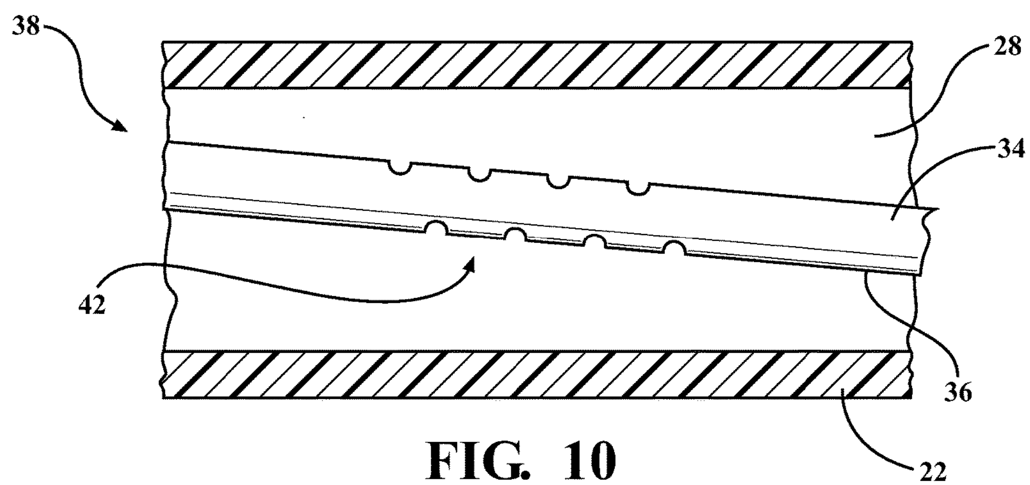
FIG. 10
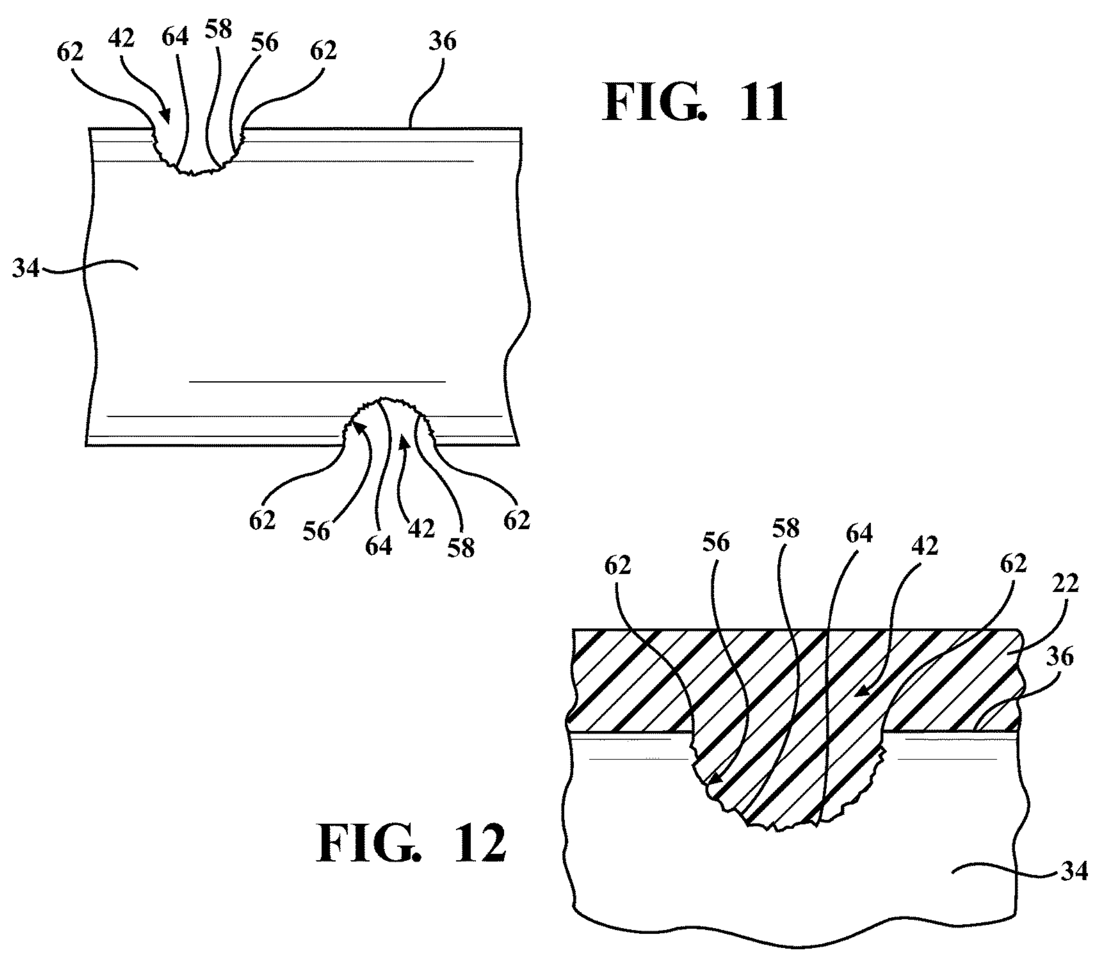
FIG. 11
FIG. 12

REMOTE CONTROL ASSEMBLY

CROSS-REFERENCE TO RELATED APPLICATIONS

This application is the National Stage of International Patent Application No. PCT/US2014/071256, filed Dec. 18, 2014, the entire contents of which are hereby incorporated by reference.

BACKGROUND OF THE INVENTION

1. Field of the Invention

The present invention generally relates to a remote control assembly.

2. Description of the Related Art

Various remote control assemblies have been developed for many applications. Typical use of remote control assemblies includes, but is not limited to, automotive applications such as control of automatic transmissions, accelerators, clutches, cruise controls, HVAC vents, and the like. Many of these applications include the transmission of motion in a curved path by a flexible transmitting core element slidably disposed in a conduit. These conduits typically include a liner, a sheath, and at least one wire for reinforcing the sheath about the liner.

During normal operation of the remote control assembly, the wires move relative to one another, the sheath, and the liner. Current designs of the wires help reduce, but may not completely reduce, movement of the wires and/or movement of the sheath. Furthermore, current designs of the wires may deform the sheath and/or the liner when the wires move relative to the sheath.

As such, there remains an opportunity to design a wire that further reduces movement of the wires with respect to one another, the sheath, and the liner. Also, there remains an opportunity to design a wire that eliminates deformation of the sheath and/or the liner.

SUMMARY OF THE INVENTION AND ADVANTAGES

A remote control assembly includes a sheath having a longitudinal axis along a length thereof and defining an interior. A liner is disposed within the interior and coupled to the sheath. A wire has an outer surface and the wire disposed between and coupled to the sheath and the liner. The outer surface of the wire defines a plurality of notches separated into a first group of notches and a second group of notches. Each notch within each of the first and second groups defines a first distance therebetween substantially along the longitudinal axis. The first group of notches and the second group of notches define a second distance therebetween. The second distance is greater than the first distance.

BRIEF DESCRIPTION OF THE DRAWINGS

Other advantages of the present invention will be readily appreciated, as the same becomes better understood by reference to the following detailed description when considered in connection with the accompanying drawings.

FIG. 10 is an enlarged fragmented side view of a portion of the remote control assembly shown in FIG. 3.

FIG. 11 is a fragmented side view of another embodiment of the wire defining cuts within the notches.

FIG. 12 is an enlarged fragmented side view of the wire shown in FIG. 11 with a portion of the sheath disposed within a notch.

DETAILED DESCRIPTION OF THE INVENTION

Figure 1:
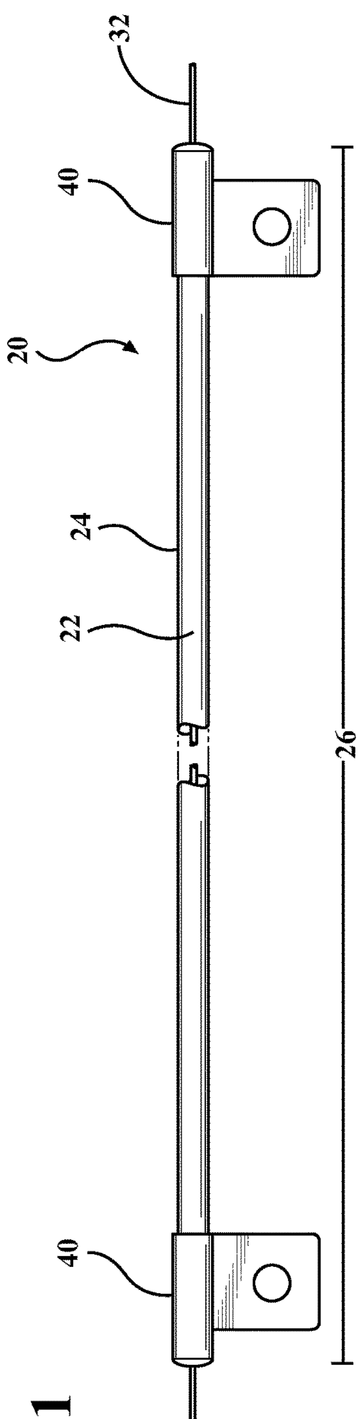
FIG. 1 is a fragmented side view of a remote control assembly.

With reference to the Figures, wherein like numerals indicate like parts throughout the several views, a remote control assembly 20 is shown in FIG. 1. Typical use of remote control assemblies includes, but is not limited to, automotive applications such as control of automatic transmissions, accelerators, clutches, cruise controls, HVAC vents, and the like.

Figure 2:
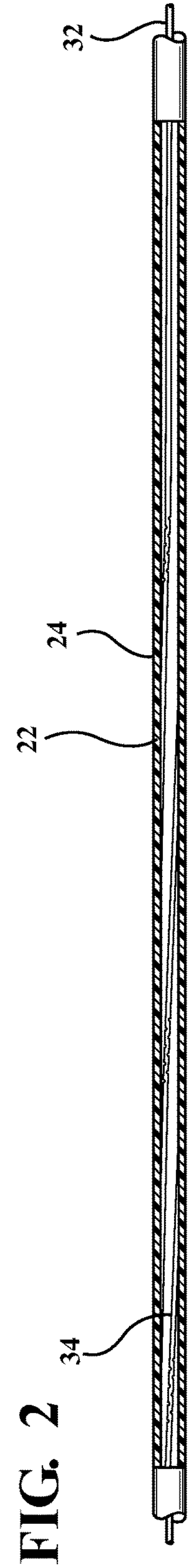
FIG. 2 is a fragmented side view of the remote control assembly with a sheath shown in partial cross-section.
Figure 3:
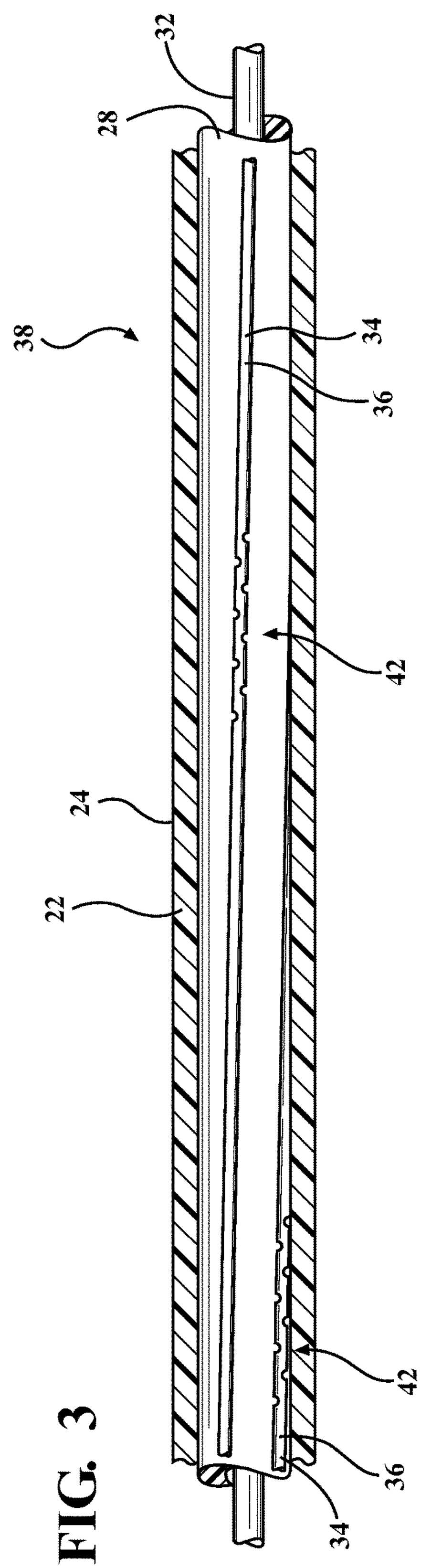
FIG. 3 is an enlarged fragmented side view of a portion of the remote control assembly shown in FIG. 2.

As best shown in FIGS. 1-3, the remote control assembly 20 includes a sheath 22 defining an interior. The sheath 22 has an outer face 24, a length 26, and a longitudinal axis A extending along the length 26. The sheath 22 is comprised of organic polymer material. Examples of suitable organic polymer materials for the sheath 22 include, but are not limited to, nylon or polyamide nylon.

The remote control assembly 20 additionally includes a liner 28 disposed within the interior of the sheath 22 and coupled to the sheath 22. The liner 28 has an exterior surface 30, and defines an opening. The liner 28 is comprised of organic polymer material. Examples of suitable organic polymer materials for the liner 28 include, but are not limited to, polytetrafluoroethylene or high-density polyethylene. However, other suitable materials may be used for the liner 28 to ensure flexibility and provide low friction support, as described in further detail below.

The remote control assembly 20 additionally includes a core element 32 disposed and moveable within the opening of the liner 28. The core element 32 transmits motion along the longitudinal axis A. The core element 32 may take various forms, but is shown in the Figures as a metal wire element that is attachable to control members for transmitting motion therebetween. The liner 28, as mentioned above, ensures flexibility and low friction support to permit the core element 32 to slidably move therein.

Figure 4:
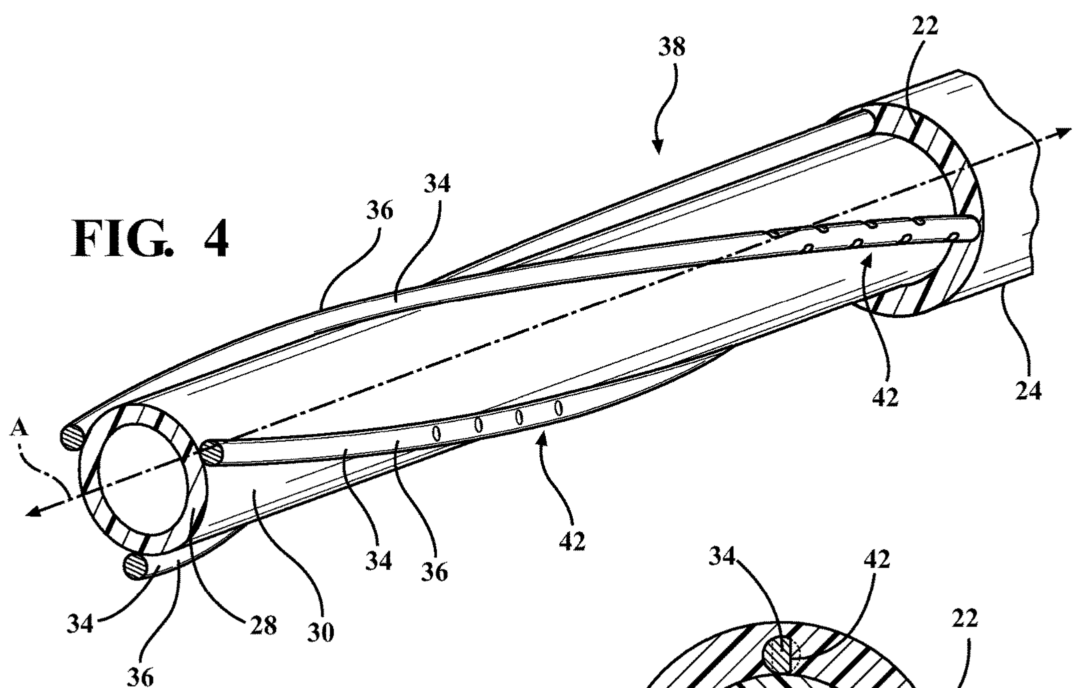
FIG. 4 is a fragmented perspective view of a conduit with a portion of the sheath removed.

The remote control assembly 20 additionally includes at least one wire 34 having a length and an outer surface 36. The wire 34 is disposed between and coupled to the sheath 22 and the liner 28. As best shown in FIG. 4, the outer surface 36 of the wire is encapsulated by the sheath 22 with a portion of the outer surface 36 abutting the liner 28. The sheath 22, the liner 28, and the wire 34 collectively form a conduit 38. The conduit 38 and the core element 32 collectively form a cable.

The remote control assembly 20 further includes fittings 40 for supporting the cable, and in particular the conduit 38, therebetween. The cable and the fittings 40 collectively form the remote control assembly 20. The fittings 40 may be fitted to the conduit 38 in any suitable manner, such as, but not limited to, overmolding to mechanically interlock the fittings 40 to the sheath 22 of the conduit 38 or using traditional fasteners without departing from the nature of the present invention. When the fittings 40 are overmolded onto the sheath 22 of the conduit 38, the fittings 40 may be comprised of polymeric or plastic materials; for example, nylon, Teflon, synthetic elastomers, polyvinyls, polyethylene, polypropylene, or their copolymers. It is to be appreciated that when the fittings 40 are fastened to the sheath 22 of the conduit 38 using traditional fasteners or any other suitable ways, the fittings 40 may comprise of a material other than the polymeric or plastic materials listed above. It is to be appreciated that the fittings 40 shown in FIG. 1 are schematic and other variations of the fittings 40 may be used without departing from the nature of the present invention.

The length of each of the wires 34 is substantially along the longitudinal axis A of the sheath 22, and the wires 34 are substantially straight about the longitudinal axis A. Said differently, the length of the wires 34 span along the longitudinal axis A such that the wires 34 maintain a continuous radial space from the longitudinal axis A. It is to be appreciated that the wires 34 may not be continuously radially spaced from the longitudinal axis A, for example, due to inconsistencies protruding from the exterior surface 30 of the liner 28 without departing from the nature of the present invention.

Although the conduit 38 shown throughout the Figures is shown including three wires 34, it is to be appreciated that the conduit 38 may include any number of wires 34 without departing from the nature of the present invention. It is also to be appreciated that even though the wire 34 is generally referred to as a single wire 34 throughout the specification, the description of the wire 34 also refers to contemplates embodiments in which multiple wires 34 are used.

The wire 34 helically wraps around the exterior surface 30 of the liner 28, as best shown in FIGS. 2-4. The pitch of the wire 34 is between eight and 12 inches with respect to the liner 28. However, it is to be appreciated that the pitch of the wire 34 may be less than eight inches or greater than 12 inches without departing from the nature of the present invention. The wire 34 remains in continuous contact with the exterior surface 30 of the liner 28. The helical wrapping of the wire 34 around the exterior surface 30 of the liner 28 provides strength and support such that the conduit 38 may bend with respect to the core element 32 without damaging the conduit 38. It is to be appreciated that the helical wrapping of the wire 34 shown throughout the Figures is merely illustrative and may have other variations without departing from the nature of the present invention. For example, the helical wrapping of the wire 34 in FIG. 4 is an exaggerated illustration of the helical wrapping of the wire 34 in FIGS. 2 and 3. However, it is to be appreciated that the helical wrapping of the wire 34 may be more than shown in FIG. 4 and may be less than shown in FIGS. 2 and 3 without departing from the nature of the present invention.

As best shown in FIGS. 3-10, the outer surface 36 of the wire 34 defines a plurality of notches 42. The plurality of notches 42 are separated into a first group of notches 44 and a second group of notches 46. It is to be appreciated that the plurality of notches 42 may be separated into two or more groups of notches 42 without departing from the nature of the present invention. For example, the outer surface 36 of the wire 34 may define three or more groups of notches 42 along the length of the wire 34. Depending on the application of the remote control assembly 20, the wire 34 may need to be a different length, which will affect the number of groups of notches 42.

Each notch 42 defines a depth. It is to be appreciated that the depth of the each notch 42 shown throughout the Figures is merely illustrative and that the depth of each notch 42 may vary without departing from the nature of the present invention. For example, the depth shown in FIGS. 2 and 3 is exaggerated and is greater than the depth shown in FIGS. 8-10 for illustrative purposes. As such, it is to be appreciated that the depth of each notch 42 may vary without departing from the nature of the present invention.

Each notch 42 within the first group of notches 44 and the second group of notches 46 defines a first distance 48 between one another along the longitudinal axis A. In one embodiment, the first distance 48 is approximately four millimeters. However, it should be appreciated that the first distance 48 may vary depending on many factors, such as an environment having extreme temperature variations, applications having extreme physical wear, and the size of the liner 28 and the sheath 22 and may, therefore, be greater or less than four millimeters. It is also to be appreciated that the first distance 48 shown throughout the Figures is merely illustrative and that the first distance 48 may vary without departing from the nature of the present invention.

The first group of notches 44 and the second group of notches 46 define a second distance 50 between one another along the longitudinal axis A. In one embodiment, the second distance 50 is approximately 152 millimeters. However, it is to be appreciated that the second distance 50 may vary depending on many factors, such as an environment having extreme temperature variations, applications having extreme physical wear, and the size of the liner 28 and the sheath 22 and may, therefore, be greater or less than 152 millimeters. However, the second distance 50 must be greater than the first distance 48 in each embodiment. The second distance 50 defined between the first group of notches 44 and the second group of notches 46 helps reduce or eliminate any audible cracking caused by the wire 34 during operation of the remote control assembly 20.

In one embodiment, outer surface 36 of the wire 34 is substantially smooth along the length of the wire 34. Said differently, the wire 34 is free of protrusions extending beyond the outer surface 36 of the wire 34 toward the outer face 24 of the sheath 22. In other words, the notches 42 are formed entirely below the outer surface 36 of the wire 34 such that wire 34 is free of protrusions extending beyond the outer surface 36 of the wire 34 toward the outer face 24 of the sheath 22. When the notches 42 are formed entirely below the outer surface 36 of the wire 34, the wire 34 provides continuous support of the liner 28, which may, in turn, reduce variation of an inner diameter of the liner 28. It is to be appreciated that in other embodiments, portions of the outer surface 36 may define notches 42 that protrude radially from the rest of the outer surface 36 toward the outer face 24 of the sheath 22, as described in further detail below.

The first group of notches 44 has a first row of notches 52 and a second row of notches 54 radially spaced from the first row of notches 52 along the outer surface 36 of the wire 34. In other words, the first row of notches 52 and the second row of notches 54 may be radially spaced from one another at any desired angle. In one embodiment, the first row of notches 52 are radially spaced 180 degrees from the second row of notches 54. However, it is to be appreciated that the first row of notches 52 and the second row of notches 54 may be radially spaced less than 180 degrees from one another without departing from the nature of the present invention. It is also to be appreciated that the wire 34 may define more than a first row of notches 52 and a second row of notches 54 without departing from the nature of the present invention. For example, the wire 34 may define three or more rows of notches 42 that are radially spaced from one another about the longitudinal axis A without departing from the nature of the present invention.

Figure 6:
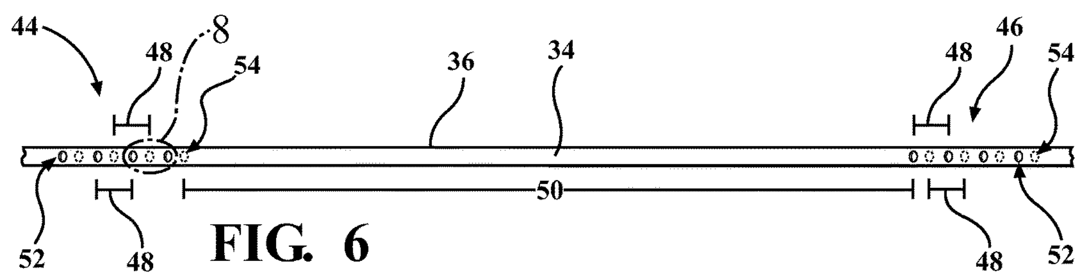
FIG. 6 is a fragmented top view of a wire of the conduit defining notches therein.
Figure 7:
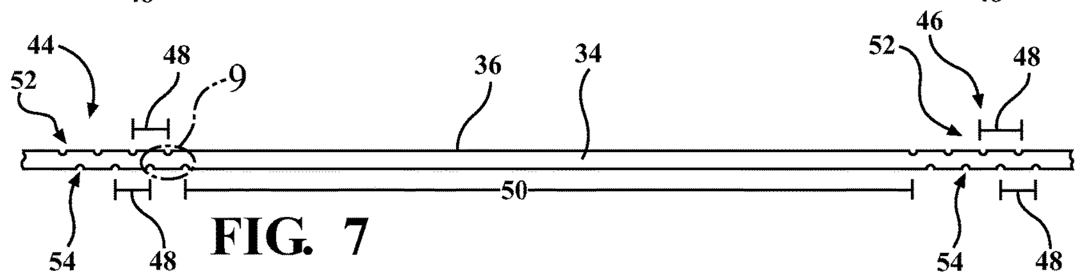
FIG. 7 is a fragmented side-view of the wire of the conduit defining notches therein.

In one embodiment, when the first row of notches 52 and the second row of notches 54 are radially spaced 180 degrees from one another, each notch 42 of the first row of notches 52 is offset with respect to and along the longitudinal axis A from each notch 42 of the second row of notches 54, as best shown in FIGS. 6 and 7. Offsetting the first row of notches 52 from the second row of notches 54 helps the wire 34 retain structural integrity. If the first row of notches 52 and the second row of notches 54 were to align with one another with respect to and along the longitudinal axis A, the diameter of the wire 34 would decrease where the notches 42 of the first row of notches 52 and the second row of notches 54 aligned along the longitudinal axis A. Furthermore, the wire 34 has at least one notches 42 of the first row of notches 52 disposed between at least two notches 42 of the second row of notches 54, as also best shown in FIGS. 6 and 7.

Each notch 42 of the first row of notches 52 is equidistant from one another along the longitudinal axis A. Likewise, each notch 42 of the second row of notches 54 are equidistant from one another along the longitudinal axis A. The second group of notches 46 also has a first row of notches 52 and a second row of notches 54 radially spaced from the first row of notches 52 along the outer surface 36 of the wire 34. The first row of notches 52 of both the first group of notches 44 and the second group of notches 46 correspond to one another. In other words, the first row of notches 52 of the first group of notches 44 and the first row of notches 52 of the second group of notches 46 align with one another along the outer surface 36 and along the length of the wire 34. Likewise, the second row of notches 54 of the first group of notches 44 and the second row of notches 54 of the second group of notches 46 align with one another along the outer surface 36 and along the length of the wire 34.

Similarly, each notch 42 of the first row of notches 52 of the second group of notches 46 is equidistant from the other notches 42 along the longitudinal axis A, and each notch of the second row of notches 54 of the second group of notches 46 is equidistant from the other notches along the longitudinal axis A. As mentioned above, the plurality of notches 42 may be separated into two or more groups of notches 42, which, in turn, results in two or more first rows of notches 42 and two or more second rows of notches 42.

To secure the sheath 22 to the wire 34, a portion of the sheath 22 is disposed within the notches 42 of the wire 34. Said differently, the notches 42 have an inner surface 56 defining a cavity 58 with the portion of the sheath 22 entirely filling the cavity 58. The portion of the sheath 22 disposed within the notches 42 of the wire 34 secures the wire 34 to the sheath 22. In one embodiment, the sheath 22 may be overmolded onto the wire 34, which allows the portion of the sheath 22 to be disposed within the notches 42 of the wire 34.

Figure 8:
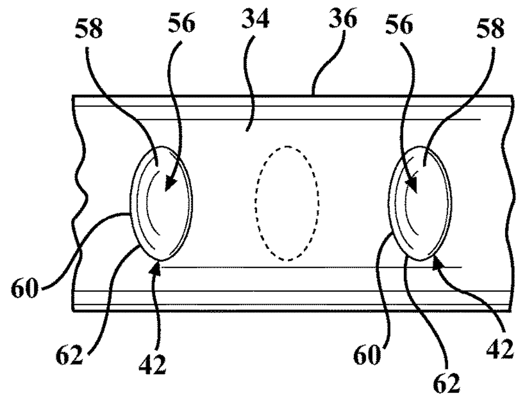
FIG. 8 is an enlarged fragmented top view of a portion of the wire circled in FIG. 6.

In one embodiment of the present invention, as best shown in FIGS. 6 and 8, an intersection of the inner surface 56 of the notches 42 and the outer surface 36 of the wire 34 form an oval-shaped perimeter 60. It is to be appreciated that the inner surface 56 of the notches 42 and the outer surface 36 of the wire 34 may form any shaped perimeter, such as, but not limited to, circular or square, without departing from the nature of the present invention.

In one embodiment, the intersection of the inner surface 56 of the notches 42 and the outer surface 36 of the wire 34 form and define a ridge 62. In this embodiment of the ridge 62, as shown throughout the Figures, the ridge 62 is a right angle. Said differently, the inner surface 56 of the notches 42 is perpendicular to the longitudinal axis A at the intersection and the outer surface 36 of the wire 34 is parallel to the longitudinal axis A at the intersection such that the inner surface 56 and the outer surface 36 form a right angle. It is to be appreciated that in other embodiments the ridge 62 formed by the intersection of the inner surface 56 and the outer surface 36 may protrude radially from the outer surface 36 toward the outer face 24 of the sheath 22. In such embodiments, the ridge 62 may be a plurality of teeth extending from the outer surface 36 of the wire 34 toward the outer face 24 of the sheath 22.

Figure 9:
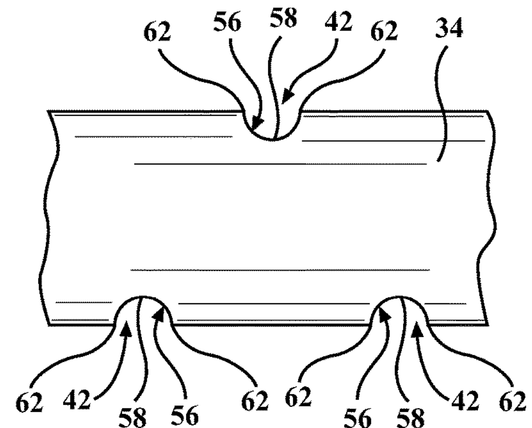
FIG. 9 is an enlarged fragmented side view of a portion of the wire circled in FIG. 7.
Figure 9A:
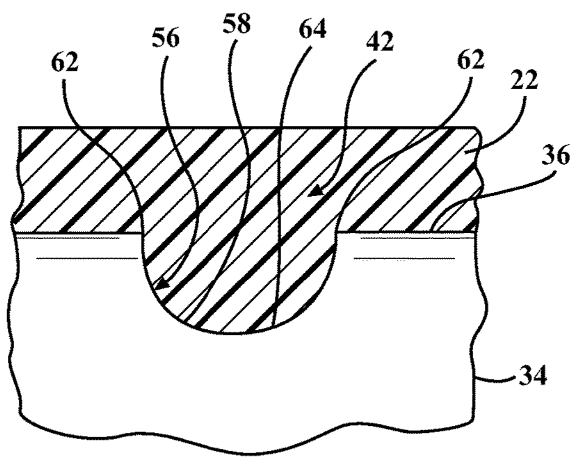
FIG. 9A is an enlarged fragmented side view of the wire shown in FIG. 9 with a portion of the sheath disposed within a notch.

In one embodiment, the inner surface 56 of the notches 42 is substantially smooth, as best shown in FIGS. 7, 9, and 10. Said differently, the inner surface 56 is free of protrusions extending beyond the inner surface 56 toward the outer surface 36 of the wire 34. However, it is to be appreciated that in other embodiments the inner surface 56 of the wire 34 may define a plurality of cuts 64, as shown in FIGS. 11 and 12. As shown in FIG. 12, a portion of the sheath 22 entirely fills the cuts 64 defined within the inner surface 56 of the wire 34. The sheath 22 entirely filling the cuts 64 helps further secure the sheath 22 to the wire 34.

The plurality of notches 42 helps the wire 34 to remain in continuous engagement with the sheath 22. The continuous engagement of the wire 34 to with the sheath 22 helps reduce or eliminate the risk of the sheath 22 shrinking away from the fittings 40 after installation, which is often referred to as shrinkback. In circumstances in which shrinkback occurs, it may make installation of the fittings 40 onto the conduit 38 more difficult. In other words, a smaller portion of the outer surface 36 of the sheath 22 is available for coupling to the fittings 40 when shrinkback occurs. Furthermore, exposed wires 34 in the conduit can cause damage to molds in which ends of the sheath 22 are disposed for molding the fittings 40 thereabout.

Figure 5:
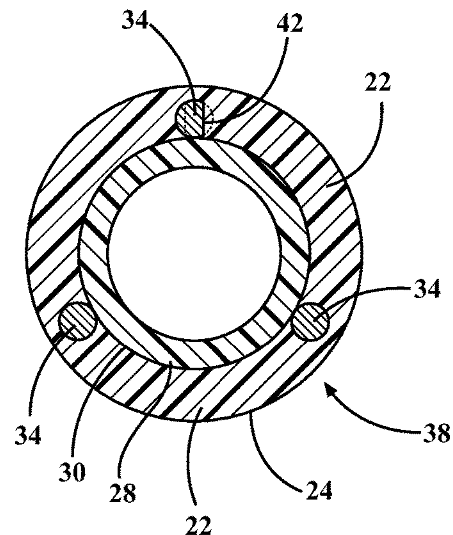
FIG. 5 is a front cross-sectional view of the conduit.

To best secure the wire 34 to the sheath 22, the wire 34 is arranged such that neither the first row of notches 52 nor the second row of notches 54 face the liner 28, as best shown in FIGS. 3-5 and 10. When the wire 34 is arranged such that neither the first row of notches 52 nor the second row of notches 54 face the liner 28, the sheath 22 fills both the first row of notches 52 and the second row of notches 54, as shown in FIG. 5. When the sheath 22 fills both the first row of notches 52 and the second row of notches 54, the wire 34 is better secured to the sheath 22. However, if one of the first row of notches 52 or the second row of notches 54 face the liner 28, the other one of the first row of notches 52 or the second row of notches 54 is filled with the portion of the sheath 22 to secure the wire to the sheath 22. This is advantageous and provides ease of manufacturing the conduit 38 since the sheath 22 will fill at least a portion of the plurality of notches 42, regardless of the orientation of the wire 34 and, in turn, the notches 42 with respect to the liner 28.

It is to be appreciated that configurations of the liner 28, the wire 34, and the sheath 22 throughout the Figures is merely illustrative, and that various components of the liner 28, the wire 34, and the sheath 22 may not be drawn to scale. Moreover, different variations of the liner 28, the wire 34, and the sheath 22 may be utilized in the remote control assembly 20 without departing from the nature of the present invention. For example, the liner 28 may have a thickness that is greater or less than the thickness shown throughout the Figures. Similarly, the sheath 22 may have a thickness that is greater or less than the thickness as shown throughout the Figures. Likewise, the wire 34 may have a diameter that is greater or less than the thickness shown throughout the Figures. Moreover, the notches 42 of the wire 34 may be defined further into the wire 34 such that a depth of the notches 42 may be a greater portion of the diameter of the wire 34 than is shown throughout the Figures, or the notches 42 of the wire 34 may be defined less into the wire 34 such that the depth of the notches 42 may be smaller portion of the diameter of the wire than is shown throughout the Figures.

The invention has been described in an illustrative manner, and it is to be understood that the terminology which has been used is intended to be in the nature of words of description rather than of limitation. Many modifications and variations of the present invention are possible in light of the above teachings, and the invention may be practiced otherwise than as specifically described.

What is claimed is:

1. A remote control assembly, said remote control assembly comprising:
- a sheath having a longitudinal axis along a length thereof and defining an interior;
- a liner disposed within said interior and coupled to said sheath; and
- a wire having an outer surface with said wire disposed between and coupled to said sheath and said liner;
- wherein said outer surface of said wire defines a plurality of notches separated into a first group of notches and a second group of notches with each notch within each of said first and second groups defining a first distance therebetween substantially along said longitudinal axis, and said first group of notches and said second group of notches defining a second distance therebetween with said second distance being greater than said first distance; and
- wherein said wire is free of any notches along said second distance defined between said first and second group of notches.

2. The remote control assembly as set forth in claim 1 wherein said wire has a length substantially along said longitudinal axis and is substantially straight about said longitudinal axis along said length.

3. The remote control assembly as set forth in claim 1 wherein said liner has an exterior surface and wherein said wire helically wraps around said exterior surface about said longitudinal axis.

4. The remote control assembly as set forth in claim 1 wherein a portion of said sheath is disposed within said plurality of notches.

5. The remote control assembly as set forth in claim 1 wherein said notches have an inner surface defining a plurality of cuts with said sheath entirely filling said cuts.

6. The remote control assembly as set forth in claim 1 wherein said outer surface is substantially smooth.

7. The remote control assembly as set forth in claim 1 wherein said notches are formed entirely below said outer surface.

8. The remote control assembly as set forth in claim 1 wherein said sheath is comprised of nylon.

9. The remote control assembly as set forth in claim 1 further comprising a core element and wherein said liner defines an opening with said core element disposed and moveable within said opening of said liner along said longitudinal axis.

10. A remote control assembly, said remote control assembly comprising:
- a sheath having a longitudinal axis along a length thereof and defining an interior;
- a liner disposed within said interior and coupled to said sheath; and
- a wire having an outer surface with said wire disposed between and coupled to said sheath and said liner;
- wherein said outer surface of said wire defines a plurality of notches separated into a first group of notches and a second group of notches with each notch within each of said first and second groups defining a first distance therebetween substantially along said longitudinal axis, and said first group of notches and said second group of notches defining a second distance therebetween with said second distance being greater than said first distance; and
- wherein said wire has a length substantially along said longitudinal axis and is substantially straight about said longitudinal axis along said length.

11. The remote control assembly as set forth in claim 10 wherein said liner has an exterior surface and wherein said wire helically wraps around said exterior surface about said longitudinal axis.

12. The remote control assembly as set forth in claim 10 wherein a portion of said sheath is disposed within said plurality of notches.

13. The remote control assembly as set forth in claim 10 wherein said notches have an inner surface defining a plurality of cuts with said sheath entirely filling said cuts.

14. The remote control assembly as set forth in claim 10 wherein said outer surface is substantially smooth.

15. The remote control assembly as set forth in claim 10 further comprising a core element and wherein said liner defines an opening with said core element disposed and moveable within said opening of said liner along said longitudinal axis.

16. The remote control assembly as set forth in claim 10 wherein said notches are formed entirely below said outer surface.

17. A remote control assembly, said remote control assembly comprising:
- a sheath having a longitudinal axis along a length thereof and defining an interior;
- a liner disposed within said interior and coupled to said sheath; and
- a wire having an outer surface with said wire disposed between and coupled to said sheath and said liner;
- wherein said outer surface of said wire defines a plurality of notches separated into a first group of notches and a second group of notches with each notch within each of said first and second groups defining a first distance therebetween substantially along said longitudinal axis, and said first group of notches and said second group of notches defining a second distance therebetween with said second distance being greater than said first distance; and
- wherein said first group of notches has a first row of notches and a second row of notches radially spaced from said first row of notches along said outer surface of said wire.

18. The remote control assembly as set forth in claim 17 wherein said wire has a length substantially along said longitudinal axis and is substantially straight about said longitudinal axis along said length.

19. The remote control assembly as set forth in claim 17 wherein a portion of said sheath is disposed within said plurality of notches.

20. The remote control assembly as set forth in claim 17 further comprising a core element and wherein said liner defines an opening with said core element disposed and moveable within said opening of said liner along said longitudinal axis.

21. The remote control assembly as set forth in claim 17 wherein each of said notches of said first row of notches are equidistant from one another along said longitudinal axis.

22. The remote control assembly as set forth in claim 17 wherein each of said notches of said second row of notches are equidistant from one another along said longitudinal axis.

23. The remote control assembly as set forth in claim 17 wherein said first row of notches are radially spaced 180 degrees from said second row of notches about said outer surface of said wire.

24. The remote control assembly as set forth in claim 17 wherein each notch of said first row of notches is offset with respect to and along said longitudinal axis from each notch of said second row of notches.

25. The remote control assembly as set forth in claim 17 wherein at least one notch of said first row of notches is disposed between at least two notches of said second row of notches.

* * * * *